(No Model.)
H. D. JUSTI.
HEATING APPARATUS.
No. 424,210. Patented Mar. 25, 1890.
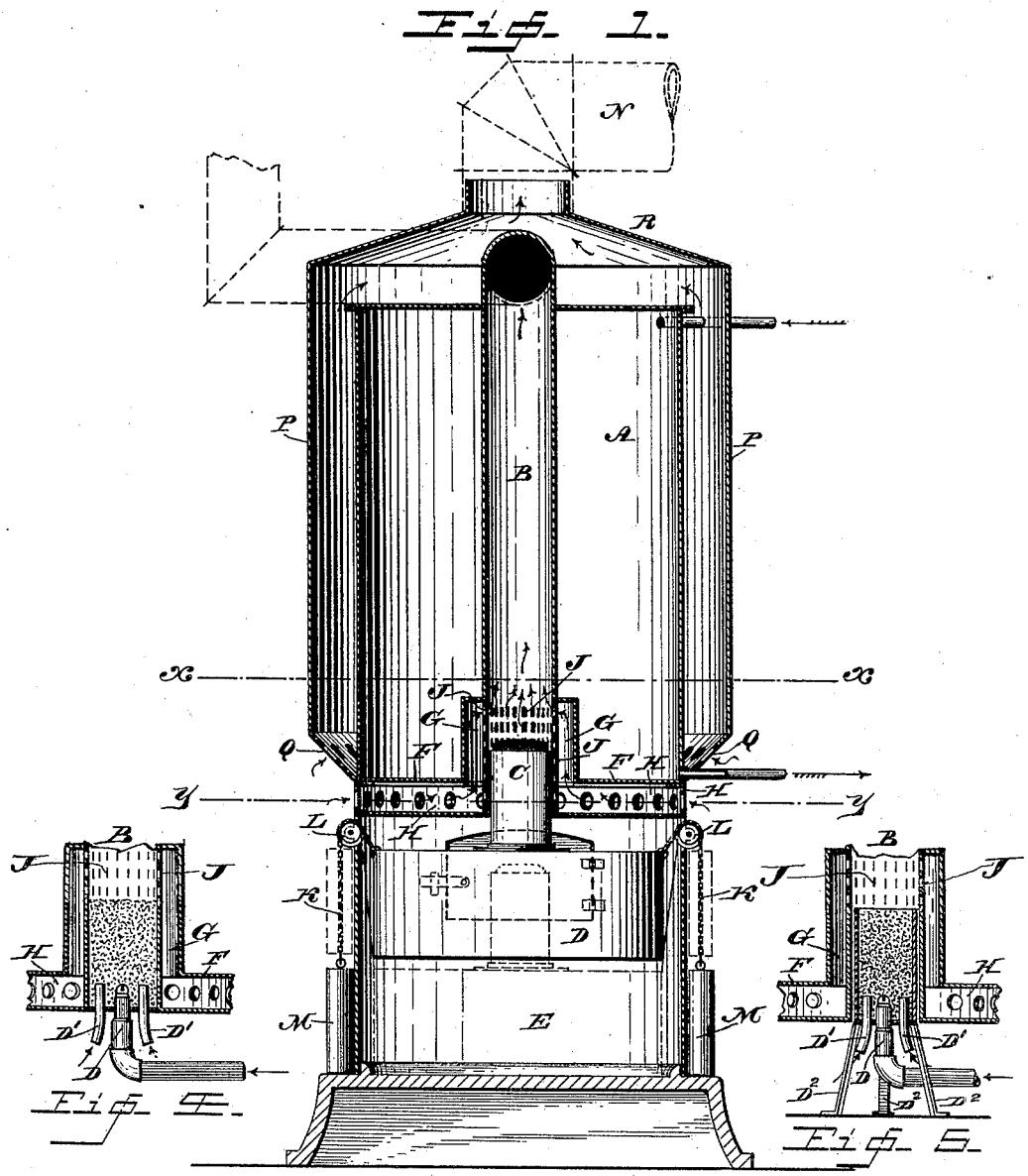
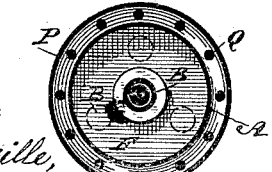
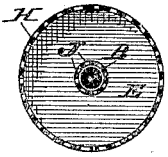
WITNESSES:
L. Douville,
C. B. Hyer
INVENTOR:
Henry D. Justi
BY John A. Wiedersheim
ATTORNEY

UNITED STATES PATENT OFFICE.

HENRY D. JUSTI, OF PHILADELPHIA, PENNSYLVANIA.

HEATING APPARATUS.

SPECIFICATION forming part of Letters Patent No. 424,210, dated March 25, 1890.

Application filed October 26, 1889. Serial No. 328,310. (No model.)

*To all whom it may concern:*

Be it known that I, HENRY D. JUSTI, a citizen of the United States, residing in the city and county of Philadelphia, State of Pennsylvania, have invented a new and useful Improvement in Heating Apparatus, which improvement is fully set forth in the following specification and accompanying drawings.

My invention consists of a heating apparatus formed of a boiler having a flue therein, an air-chamber surrounding a perforated portion of the flue, and a lamp or heater entering said flue, whereby the burner is supplied with oxygen in large volume, thus highly heating the flue and consequently the boiler, producing hot water or steam, while the heat of the flue may be directed into pipes which convey the same to a place of service.

Figure 1 represents a vertical section of a heating apparatus embodying my invention. Fig. 2 represents a horizontal section on line *x x*, Fig. 1, on a reduced scale. Fig. 3 represents a horizontal section on line *y y*, Fig. 1, on a reduced scale. Figs. 4 and 5 represent vertical sections of portions of modifications.

Similar letters of reference indicate corresponding parts in the several figures.

Referring to the drawings, A designates a boiler or chamber, from the bottom of which rises a chimney or flue B, which is open at both ends and receives at its lower end the burner C of a lamp D, the latter being inclosed in a base E, which supports the boiler. The bottom F of the boiler is raised around the lower portion of the flue B, forming an air-chamber G, the upper end whereof is closely connected with the flue, thus preventing communication between the boiler and air-chamber. The bottom of the air-chamber is open and communicates with the atmosphere through a perforated rim H, which is interposed between the bottom of the boiler and top of the base E.

In the flue B, below the top of the air-chamber, are perforations J, which form communications between said chamber and flue, and thus admit air to the burner C.

The lamp is attached to chains or cords K, which pass over pulleys L, mounted on the base E, and carrying on their outer ends the weights or counter-balances M, whereby the lamp may be readily raised and lowered, and when raised may have its burner retained in operative position within the flue B.

Access is had to the burner when lowered through a slide or door in the base. (Shown in dotted lines, Fig. 1.)

It will be seen that the flame of the lamp is supplied with oxygen in large quantities, thus highly heating the flue B and producing hot water or steam in the boiler, the latter being provided with pipes for supplying water to and directing the hot water or steam from the same.

A jacket P surrounds the boiler A and receives air through the perforations Q therein, the same being heated by the boiler conjointly with the radiated heat from the products of combustion passing through the flue B, thus producing a heated volume of air in the top R of the jacket as a dome, the said hot air entering a pipe N, and thus being adapted to be directed elsewhere.

It is evident that a number of flues similar to the flue B may be provided if the number of burners be increased, as shown by the dotted lines, Fig. 2.

In Fig. 4, in lieu of the lamp, I employ a gas-burner D and air-pipes D', the same entering the lower portion of the flue B, filled with coarse sand, broken stone, or other suitable material, in which the gas and air mingle, thus producing an intense heat.

In Fig. 5 the gas and air pipes enter a receptacle for sand, stone, &c., the same being removably supported on legs or standards $D^2$, said receptacle being readily inserted into and withdrawn from the lower portion of the flue B.

Having thus described my invention, what I claim as new, and desire to secure by Letters Patent, is—

1. In a heater, substantially as described, a boiler or chamber having a flue, with an air-chamber surrounding the same, said flue being provided with a perforation or perforations below the top of said chamber, the flue entering said boiler or chamber and receiving the heat of a lamp or other heating medium, as set forth.

2. In a heater, a boiler with a flue passing through the same, an air-chamber surrounding the perforated lower end of said flue, a base on which said boiler rests, a burner within said base, and a perforated rim between said base and boiler furnishing inlets to said air-chamber, said parts being combined substantially as described.

3. In a heater, a boiler with a vertical flue passing through the same, an air-chamber surrounding the perforated lower end of said flue, said flue being provided with a perforation or perforations below the top of said chamber, a base with a burner, a perforated rim between said base and boiler, and a jacket surrounding said boiler and having perforations at its base, said parts being combined substantially as described.

HENRY D. JUSTI.

Witnesses:
JOHN A. WIEDERSHEIM,
A. P. JENNINGS.